Dec. 23, 1941.          C. J. HOLLAND          2,267,153
VARIABLE LOAD TRUCK SPRING
Filed June 15, 1940          2 Sheets-Sheet 1
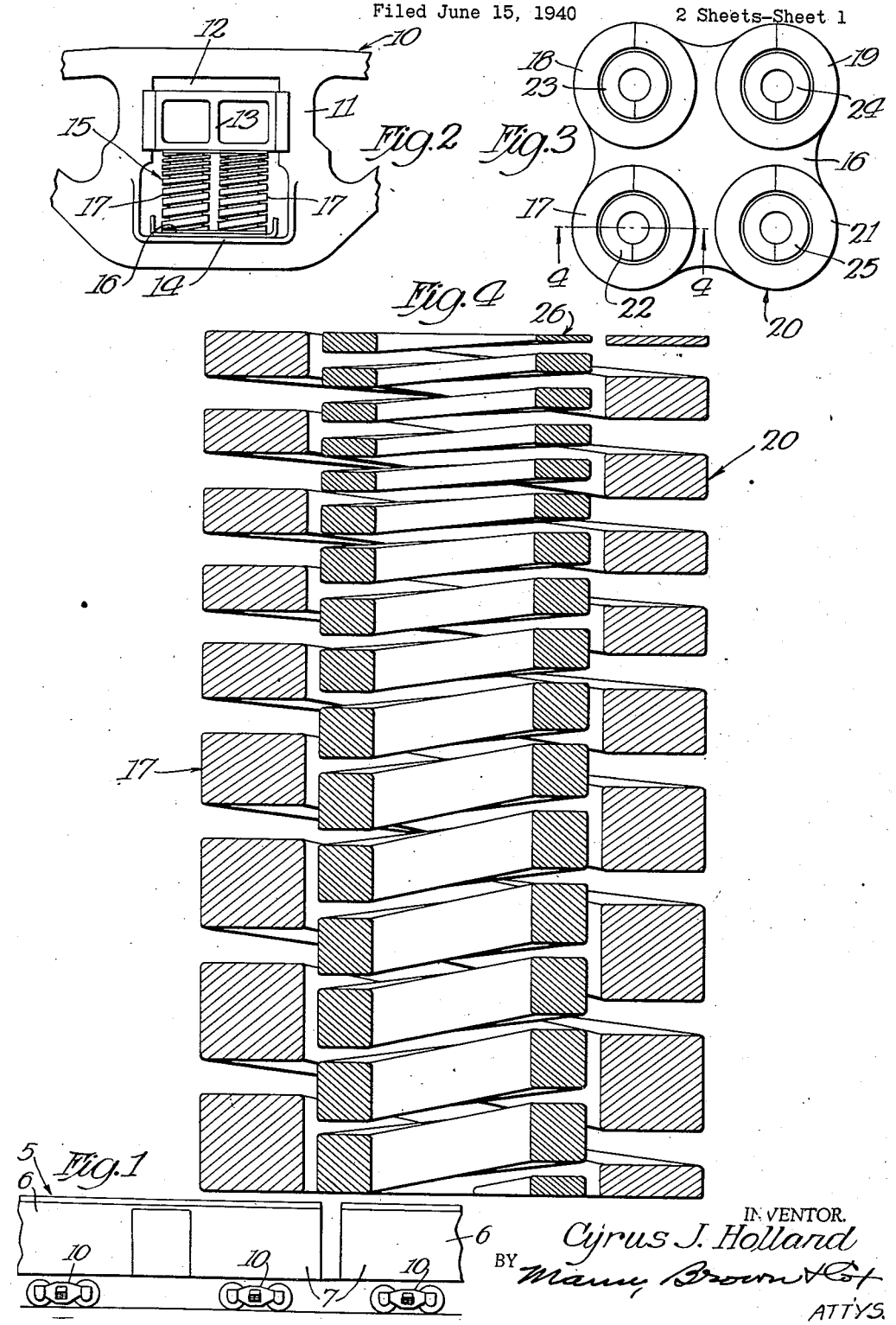
INVENTOR.
Cyrus J. Holland
BY Mann, Brown & Co.
ATTYS.

Dec. 23, 1941.  C. J. HOLLAND  2,267,153
VARIABLE LOAD TRUCK SPRING
Filed June 15, 1940    2 Sheets-Sheet 2
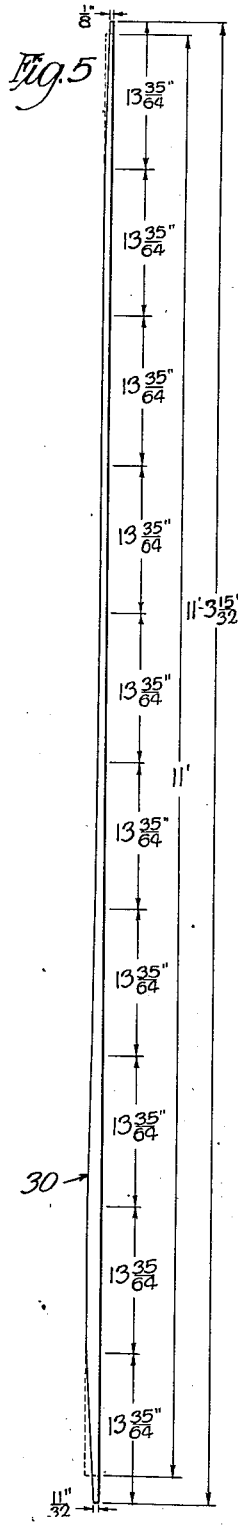
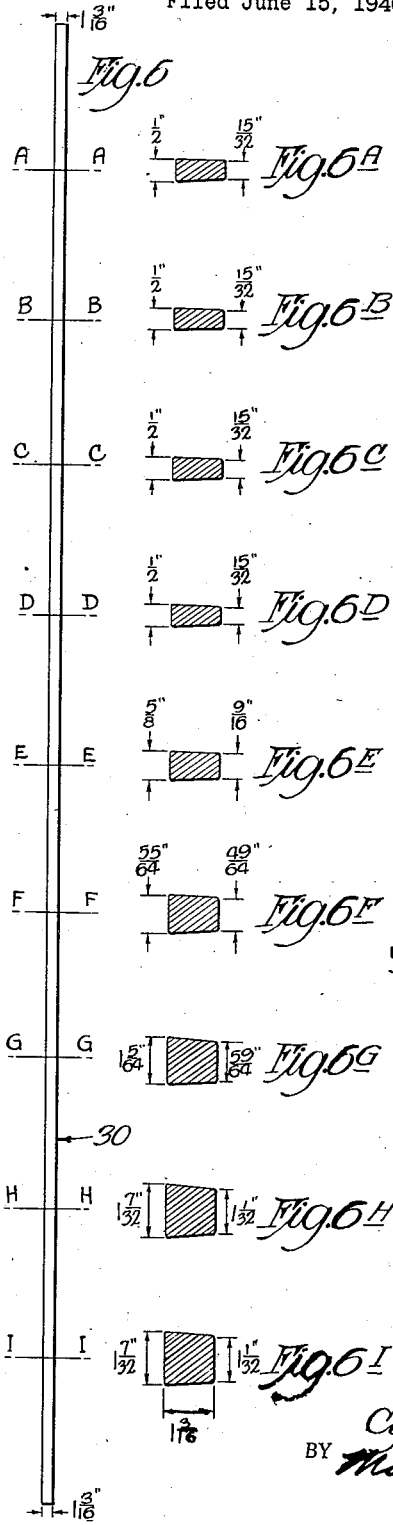
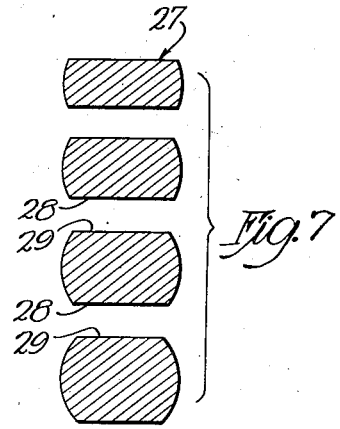
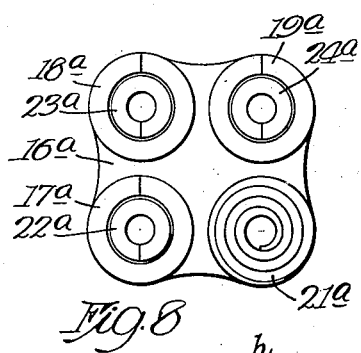
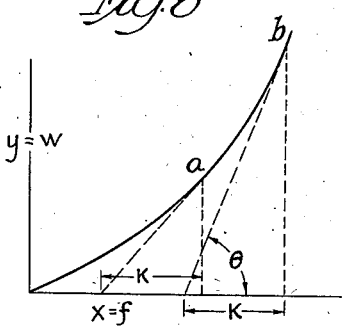
INVENTOR.
Cyrus J. Holland
BY Mann, Brown &
ATTYS.

Patented Dec. 23, 1941

2,267,153

UNITED STATES PATENT OFFICE 2,267,153

VARIABLE LOAD TRUCK SPRING

Cyrus J. Holland, Chicago, Ill.

Application June 15, 1940, Serial No. 340,798

10 Claims. (Cl. 267—4)

This invention relates to resilient units and more particularly to resilient units for use in vehicles and in other relations where a spring having a substantially constant frequency under all loads is necessary or desirable.

One of the objects of the invention is the provision of a new and improved resilient unit that is so constructed that its frequency of vibration will remain substantially constant for all loads.

Another object of the invention is the provision of a new and improved resilient element so constructed that it will have substantially the same effective static deflection for various loads between certain limits within which the spring is required to operate in any particular application.

A further object of the invention is the provision of new and improved spring suspension for railway cars that is so constructed that the spring suspension of all cars of the train will have the same frequency of vibration regardless of the weights of the loads carried by the various cars whereby harmonic action may be avoided for all of the cars by avoiding the critical vibration speed of the train on which the assemblies are installed.

A further object of the invention is the provision of a new and improved spring that is adapted to compensate for the variations in load and one in which the effective static deflection remains constant irrespective of the load variation.

A further object of the invention is the provision of a new and improved spring that, when in use, will support light and intermediate loads with the same amount of resiliency as heavy loads and at the same time have a constant frequency for all loads.

A further object of the invention is the provision of a new and improved spring having a constant effective static deflection that is efficient in use, simple in design, easily installed, and that is not likely to become broken or deranged.

Other and further objects and advantages of the invention will appear from the following description taken in connection with the accompanying drawings in which—

Fig. 1 is a side elevation of a railway train with the invention in position thereon, shown more or less diagrammatically, and with parts broken away;

Fig. 2 is a side elevation of a car truck showing the invention in position therein, more or less diagrammatic and with parts broken away;

Fig. 3 is a plan view of the spring group or spring assembly shown in Fig. 2;

Fig. 4 is a section on the line 4—4 of Fig. 3, showing one of the concentric spring units;

Fig. 5 is a side elevation of a blank bar from which the outer spring is made;

Fig. 6 is a plan view thereof;

Figs. 6A and 6I show cross-sections of the blank at each turn of the spring on sections A—A to I—I;

Fig. 7 is a vertical section of a portion of a modified form of the spring;

Fig. 8 is a view similar to Fig. 3 but showing a modified form of assembly; and

Fig. 9 is a graph illustrating a load deflection curve for the spring.

The modern trend in car building is toward lighter cars. With the advent of autogenous and arc welding and the extensive use of light sheet metal of high tensile strength in fabricating car structures together with numerous innovations in car construction, the redesigned cars are from 5% to 15%, or even more, lighter in weight than the conventional ones of a few years ago. The conventional springs of the coil or helical type are designed to support capacity loads for the particular car. There has been but small departure in the shape, form and dimensions of these springs for a number of years.

Any spring follows Hooke's law ("A body acted on by external forces will deform in proportion to the stress developed, so long as the unit stress does not exceed a certain value, which varies for the different materials." Kent, 11th ed., 7-04) and if it be a conventional helical spring, for instance, with uniform diameter, pitch and cross-section, it has a variety of natural frequencies of oscillation which are related to and determined by the load on the spring. Each different load causes the spring to have a different frequency. Until the frequency of shock or impulses (number of shocks or impulses per minute) received by the spring is in the neighborhood of the natural frequency of the spring (number of oscillations per minute), the spring will not bounce or oscillate to any great extent. As the frequency of shock or impulse approaches the frequency of the free acting turns of the spring, the spring will bounce or oscillate with increasing intensity until the number of impulses imparted to the spring are in phase with, or correspond to, the natural vibration of the spring at which point the most violent oscillations will occur. This is known as the critical period and the spring action is called harmonic action.

The major factor in imparting impulses to spring vibration in a railway car is the track joint although wheel and other irregularities contribute to change or modify both the frequency or the amplitude or both. The present conventional type of freight car truck spring is designed to carry its maximum load at one inch deflection irrespective of the capacity of the spring group and it so happens that one inch static deflection on 33' rails corresponds to a speed in the neighborhood of 35 miles per hour, at which point violent oscillations will occur; that is, with the conventional bolster spring deflected by its maximum load, its vibration frequency is substantially the same as, or in phase with, the number of impulses given the spring by the wheels passing over the ends of 33' rails when the train is traveling in the neighborhood of 35 miles per hour. The empty car on present conventional truck springs causes a static deflection of ¼" and on 33' rail, this deflection corresponds to a speed of 70 miles per hour, at which point violent oscillations will occur so that with the present conventional freight car truck spring, all of the critical frequencies will be between speeds of 35 and 70 miles per hour and are spread over this entire range depending on the load upon the springs at the time. It has been ascertained by experiment that a spring having a constant effective static deflection has a constant frequency and that all springs having the same effective static deflection have the same frequency.

The spring disclosed in this application differs from the conventional helical bolster supporting spring in that each is so designed as to have approximately the same frequency; i. e., a constant effective static deflection under the load of the empty car, the intermediate load and the full load as the present conventional truck spring has under the full load only, so that the critical periods of oscillation for this spring at all loads is confined to a narrow range in the neighborhood of say 35 miles per hour, or even less, on 33' rails instead of being spread over the entire range of speeds from 35 miles per hour to 70 miles per hour depending on the load.

A train of cars will ordinarily contain cars that are empty, fully loaded and in all stages between empty and fully loaded. Even the fully loaded cars will vary in weight, as for instance, a car loaded with automobiles will weigh far less than one loaded with coal or brick, so that the critical periods of the various cars with the conventional springs will vary over a wide range. With the conventional springs there will likely be some one or other of the cars of a long train that would be at, or near, its critical vibration point at almost any speed between 35 and 70 miles per hour whereas with the cars equipped with my invention, it is only necessary to operate the train at speeds above or below the critical speed of approximately 35 miles per hour or say from 30 to 40 miles per hour. This is considered an extremely important feature of this invention.

The present invention seeks to provide springs for railway cars, vehicles, and the like, in which each spring for each vehicle will have a constant frequency regardless of the load supported thereby and this frequency will be the same for all of the springs for all cars in the train so that harmonic action of all of the springs will occur simultaneously throughout the train. By means of this arrangement, the engineer, knowing the critical speed for the springs employed in the train, may, by passing rapidly through that particular speed, reduce the harmonic action of the springs to a minimum.

The desired characteristic of this special spring is that when loaded with any load, it has a constant effective static deflection. For the purpose of illustrating one application of such a spring, it is illustrated and described as being employed as a car or bolster supporting spring. Such a spring may be useful in other relations where constant frequency is useful or desirable.

The desired characteristic of this special spring for use in railway cars is that when loaded with any load from 2000 lbs. to its maximum capacity, it shall have a constant effective static deflection. The term "static deflection" is to be defined (as indicated in Fig. 9) as follows:

If the load-deflection curve is plotted as in Fig. 9, with load as ordinate and deflection as abscissa, the length between the intercepts on the x-axis of the normal to the curve at any point, and the tangent to the curve at the same point, shall be a constant.

By definition, then, the tangent of any angle between such normal and tangent at any point is—

$$\tan \theta = \frac{y}{k}$$

which is, therefore, the first derivative of the variable function, and $$\frac{dy}{dx} = \frac{y}{k}$$

from which $$\frac{dx}{dy} = \frac{k}{y}$$

$$dx = \frac{k \, dy}{y} = k \cdot \frac{dy}{y}$$

$$x = \int k \cdot \frac{dy}{y} = k \int \frac{dy}{y}$$

Since $$\int \frac{dy}{y} = \log e \, y$$

(1) $\quad x = k \log e \, y + c$

In substituting the load into this formula, it must be considered that we are concerned with thousands of pounds, but that we are plotting natural logarithms of $$\frac{W}{1000}$$

if W is the load in pounds. Therefore, we can state the relationship in terms of the load and deflection thus:

(2) $\quad f = k \log e \frac{W}{1000} + c$ in which $f$ = deflection under any load
$k$ = the constant effective "static deflection" as defined
$w$ = any load in pounds
$c$ = a constant of integration, which varies with W and with $f$ in terms of deflection from free length; that is, it is a constant which determines the location of the line on the graph with respect to the "$y$" axis.
$\log e$ = logarithms according to the Naperian or hyperbolic system in which the base is 2.718281828

The curve thus produced applies only when the load under consideration produces a deflection equal to or greater than $k$. There can be no "static deflection" as defined at zero load, and there can be no length $k$ on the $x$-axis until the normal to the curve is a distance $k$ from the origin of the graph at zero. Therefore, the load deflection characteristic is a straight line from zero to a deflection equal to $k$, and for any greater load follows the formula as developed.

For example, assume a spring in which we are to develop 2000 lbs. at a deflection of 1" from free length and 10,000 lbs. at a deflection of 2¼" from free length, or 1¼" further. Then $$2.25 = k \log e 10 + c$$
$$1.00 = k \log e\, 2 + c$$
$$\overline{1.25 = k (\log e\, 10 - \log e\, 2)}$$

$$k = \frac{1.25}{\log e 10 - \log e 2} = .777$$

$$2.25 = .777\ (2.30259) + c$$
$$2.25 = 1.789 + c$$
$$c = .461$$

For this assumed condition, therefore $$f = \left(.777 \log e \frac{W}{1000}\right) + .461$$

and the deflection curve is a straight line from zero deflection to a deflection of .777", the "static deflection" for the loads and deflections assumed. Any further deflection follows the curve of the function as developed.

In the conventional constructions, different spring arrangements for supporting cars of different capacities are obtained from two standard types of springs, an inner and an outer helical spring. By combining these two types in different relations, various spring capacities may be obtained for supporting the different cars. For instance, a forty ton capacity spring group or assembly is obtained by the use of four outer and two inner coils, a fifty ton group is obtained by the use of four double coils, while a seventy ton capacity spring group is obtained by employing five double springs in each spring assembly or group. There is one spring group or assembly at each end of the bolster in certain types of trucks or one or more assemblies associated with the ends of each axle as in other types of trucks.

With the decrease in the weight of the empty cars and the rearrangement of the springs to increase the capacity of the group, it is evident that the deflection of the conventional helical spring under light loads or no loads at all would be almost negligible and the car body would be but slightly less resiliently supported than if it were supported on solid columns. As a result of such an arrangement, a great amount of damage is done, during shipment, to light lading such, for instance, as furniture, automobiles, and the like, due to this lack of resiliency for light loads.

The present invention seeks to remedy this difficulty by the provision of springs which may also be standardized with two types, an inner and an outer spring, but each of which is so constructed that it has a constant effective static deflection; that is, a constant frequency under all loads as expressed in Formula 1 or 2 above. The construction of this spring may take different forms or shapes, as for instance, it may be a helical having a variable pitch, variable thickness, or variable width. For the purpose of illustrating one form of the device, a helical spring having a constant inside and outside diameter, a constant width in cross-section of its turns but having its turns variable in thickness, is employed. The spring stock is of the same width throughout its length as indicated in Fig. 6 but tapers somewhat as to its thickness as indicated in Fig. 5. It will be noted that the taper is not gradual. In the form of construction shown in Figs. 5 and 6, which is by way of example only and is intended to be only approximate in the dimensions indicated on the drawings, the thickness of the bar is variable.

Referring now to the drawings, the reference character 5 designates a railway train including a plurality of cars 6 each comprising a car body 7 and a truck 10 beneath each end of the car body. Suitable spring suspension is provided for supporting the car body from the trucks. Each truck 10 comprises a side frame 11 provided with a bolster opening 12 into which extends one end of the bolster 13 as is usual in such constructions. Each end of the bolster 13 is adapted to be supported from the seat 14 below the opening 12 by a spring group or assembly 15 of the spring suspension.

In the form of the construction shown, this assembly comprises a spring plate 16 which engages the seat 14 and on this plate is mounted, at the four corners thereof, the outer springs 17, 18, 19 and 21, respectively. If desired, or if required, each of the outer springs 17, 18, 19 and 21 has mounted therein, and concentric therewith, inner springs 22, 23, 24 and 25. If desired a suitable spring dampener, such as that shown in my Patent No. 1,990,379, February 5, 1935, for Spring suspension for railway cars, may be substituted for one of the spring units, as shown in Fig. 8, for preventing harmonic vibration of the spring assemblies at the critical speed but this will not be necessary because the engineer may be instructed to not run the train for any considerable length of time at the critical speed. The volute spring is indicated at 21a and the remaining corresponding parts are designated by the same numerals as appear in Fig. 3 with letter exponents.

Each of the outer springs 17 is so constructed that certain of the coils or turns have less capacity than the remaining coils or turns. All of the turns or coils of the spring 17 are of the same internal and external diameters and their external diameter is preferably that of the conventional bolster supporting helical spring. In order that the spring shall be capable of substantially the same effective static deflection for light loads as for heavy loads, it is so constructed that the vertical thickness of at least some of the turns will vary from one end toward the other. As shown, the thinner turns are at the upper end of the spring. The lowest turn of the spring has portions that are reduced in thickness but this is done for the purpose of squaring the lower end of the spring. The turns of the spring 17 are flat on their upper and lower faces so that when the thinner coils close, the surface contact will not tend to distort the spring but will tend to hold the turns from skewing or otherwise getting out of alignment. They are preferably right-angled parallelograms in cross-section. They may, however, be of different forms but, in any event, the adjacent portions of the turns of the spring are preferably flattened so that they will be flat against each other when the turns go solid.

For the sake of clearness of understanding, the dimensions, as calculated from the above formula, are given for a spring having a constant effective static deflection of 15/16" and with a variable load of between 2000 lbs. and 16,000 lbs. The blank or bar 30 from which the outer spring is made is illustrated in Figs. 5 and 6. From Fig. 6, it will be noted that the bar is 1 3/16" wide from one end to the other, and from Fig. 5, it will be seen that the original bar is 11' long and after the outer ends of the bar are swedged in order to give a square end to the completed spring, the bar is elongated to 11' 3 15/32" and has a variable thickness. Cross-sections of the turns are shown with dimensions. It will also be noted that the cross-section of each turn is keystone in shape with the thinner edge to the inner side so that when the bar is coiled, it will be substantially rectangular in cross-section.

Figs. 6A to 6I show a cross-section of the turns and it will be noted that the cross-sections shown in Figs. 6A, 6B, 6C and 6D are 1/2" in thickness at their outer edges and 15/32" at their inner edges. The next three turns, which are shown in Figs. 6E, 6F and 6G, are variable in thickness. Their outer thickness is 5/8", 55/64" and 15/64", respectively, while their inner edges are 9/16", 49/64" and 50/64" in thickness, respectively. The last two turns shown in 6H and 6I are each 1 7/32" thick at their outer edge and 1 1/32" at their inner edges.

When the bar is coiled, it will have the form shown in Fig. 4 in which, it will be noted, the spring is in the form of a helical with the coils or turns having uniform inner and outer diameters.

While the construction shown in Figs. 4, 5 and 6 is intended to be used as illustrating one form of construction, it will be understood that this is by way of example only and that other forms having different dimensions, configurations, arrangements of the spring, or springs of different material, may be employed, it only being necessary that the spring have a constant frequency under all loads and be of sufficient capacity to properly support the required load.

In the operation of the device, when the spring is supporting light loads, the deflection will be principally in the upper or weaker turns of the spring and when heavier loads are applied, the upper turns will be brought into engagement with each other, that is, they will go solid and the deflection will be largely in the lower turns depending on the weight supported.

A helical spring 26 of smaller diameter is also provided which may or may not be used in connection with the helical 17, as occasion may require, to form a spring or resilient unit 20.

In order to increase the capacity of the unit, the two springs are used together concentrically arranged. The spring 26 is similar to the spring 17 in that it has its upper turns of less vertical thickness than the lower ones in a manner similar to that of the outer spring and is so constructed that it, too, will have a constant frequency at all loads, the frequency being preferably, though not necessarily, that of the outer spring. All that is necessary is that the whole spring assembly, that is, the combination of springs forming the assembly, have a constant frequency at all loads, that is, a constant effective static deflection and that this constant frequency be the same, or approximately the same, for all of the spring assemblies for the whole car. It is possible to employ springs of different frequencies in a spring unit or assembly because they operate together on a common frequency different from the individual springs. But, if this resultant frequency is constant at all loads, the required condition for that assembly is present.

In order that the turns of the inner and outer springs shall not foul or interfere with each other, one is wound right-handed and the other left, as shown in Fig. 4. The springs 17 and 26 are slightly longer than the conventional bolster supporting helical springs but when in position beneath the bolster, they will be of substantially the same length because of the fact that the upper turns are more resilient than those of the conventional spring and are compressed to a greater extent than the conventional spring so that the riding height of the empty car will be about the same as with the conventional springs and the residual travel of the new spring at any load will be about the same as the old conventional spring at full load. The operation of the double spring, or spring unit, is substantially the same as that of the single spring as described above.

In Fig. 7 is shown a modified form of spring. In this form, the spring 27 is made from a rod circular in cross-section that has been rolled to form upper and lower flat faces. The flat faces 28 and 29 of the intermediate turns will be adjacent the flat faces 29 and 28 of the turns above and below it, respectively. Instead of making the spring from rods circular in cross-section, they may be made from rods that are hexagonal or octagonal or other form in cross-section.

General experience seems to indicate that heavy loads ride better with less deflection than light loads and it may be desirable to vary the constant effective static deflection rate of different sections of the springs so as to obtain a greater constant static deflection under light loads in which case it might be desirable to use, say, 1 1/4" constant effective static deflection for the light loads for one portion of the spring and say 3/4" constant static deflection for the heavier loads for another portion of the spring. For instance, on the spring shown in Fig. 7, the two upper turns may have a constant static deflection of 1 1/4" while the two lower turns may have a constant static deflection of only 3/4".

In the practical construction or use of the spring shown in Fig. 7, it may be necessary or desirable to provide the spring with one or more additional intermediate sections each having different constant effective static deflection from the sections shown in said figure.

While theoretical accuracy in laying out the springs is extremely difficult, the measurements in the example given above approximate so closely the theoretical measurements as to give the desirable results. Accuracy is not absolutely necessary because fairly close approximation gives satisfactory results.

While in the construction shown, metallic springs of helical form are employed, it is understood that resilient units of other material such as rubber or the like or springs of other forms such as concave disks, elliptical or torsion springs may be used, it being only necessary that the unit or member have an effective static deflection that remains constant for all loads within the range of the desired capacities of the unit.

This is a continuation in part of my application, Ser. No. 222,083, filed July 30, 1938, for Variable load truck spring.

It is thought from the foregoing, taken in connection with the accompanying drawings, that the construction and operation of my device will be apparent to those skilled in the art and that changes in size, shape, proportion and details of construction may be made without departing from the spirit and scope of the appended claims.

I claim as my invention:

1. In a railway train, a plurality of cars, a truck beneath each end of each car, a plurality of spring assemblies for supporting said cars from said trucks, each spring assembly being so constructed and arranged as to have substantially the same effective static deflection for all loads whereby harmonic vibration of said cars will all occur at substantially the same speed regardless of the loads carried by the individual cars.

2. A spring for use in a bolster supporting spring assembly comprising a strip of spring metal bent to form a helical having a uniform internal and external diameter throughout the length of the spring, said spring having certain of its upper turns of the same thickness, certain of its lower turns of uniform thickness but different from that of the upper turns and having its intermediate turns of variable thickness, the different thicknesses being such as to insure the spring having a substantially constant frequency of vibration under all load conditions.

3. In a railway train, a plurality of cars, a truck beneath each end of each car, a plurality of spring assemblies for supporting said cars from said trucks, each spring assembly having the characteristics of a spring that has been made according to the formula $$f = k \log e \frac{w}{1000} + c$$

wherein $f$ is the deflection under any load, $k$ the constant effective static deflection, $w$ any load in pounds, and $c$ a constant of integration which varies with $s$ and with $f$ in terms of deflection from free length, whereby each spring assembly has substantially the same effective static deflection for all loads and harmonic vibration of said cars will occur at substantially the same speed regardless of the loads carried by the individual cars.

4. A spring for use in a bolster supporting spring assembly comprising a strip of spring metal bent to form a helical having a uniform internal and external diameter throughout the length of the spring, said spring having certain of its upper turns of the same thickness, certain of its lower turns of uniform thickness but different from that of the upper turns and having its intermediate turns of variable thickness, the different thicknesses being such as to cause the spring to have the characteristics of a spring that has been made according to the formula $$f = k \log e \frac{w}{1000} + c$$

wherein $f$ is the deflection under any load, $k$ the constant effective static deflection, $w$ any load in pounds, and $c$ a constant of integration which varies with $w$ and with $f$ in terms of deflection from free length, whereby the spring has a substantially constant frequency of vibration under all load conditions.

5. In a railway train, resilient assemblies for supporting the cars of said train, each assembly comprising a plurality of helical springs each having its turns rectangular in cross-section and each turn having an external diameter substantially the same as the conventional helical railway bolster supporting spring, at least one spring of each assembly having certain of its upper turns of the same thickness, certain of its lower turns of uniform thickness but different from that of the upper turns and having its intermediate turns of variable thickness, the different thicknesses being such as to insure said spring having a substantially constant frequency of vibration under all load conditions whereby harmonic action for loaded, empty or partly loaded cars of said train will occur simultaneously at a predetermined speed for said train.

6. A metallic resilient coil spring member comprising a plurality of turns, said turns being so constructed and arranged that they cooperate to provide a resilient unit having a substantially constant effective static deflection for variable loads.

7. A resilient coil spring member comprising a plurality of turns of variable cross-section, said turns being so constructed and arranged that they cooperate to provide a resilient unit having a substantially constant effective static deflection for variable loads.

8. A device for resiliently supporting various loads comprising a resilient unit having portions thereof with different resistivities to distortion, said portions being so constructed and arranged that they cooperate to provide a resilient unit having a substantially constant effective static deflection for various loads whereby harmonic vibration of the unit under various load and impact conditions will remain substantially constant.

9. A device of the class described for resiliently supporting different loads comprising a metallic resilient unit having portions thereof so constructed as to be differently stressed while supporting a load, said portions being so constructed and arranged that they cooperate to provide a resilient unit having a constant effective static deflection for different loads whereby the frequency of vibration of said unit remains substantially constant for different loads and harmonic vibration of said unit under various loads will remain substantially constant.

10. A device for resiliently supporting variable loads on vehicles and the like comprising a resilient unit having parts of different cross-sectional areas, said parts being so constructed and arranged that they cooperate to provide a resilient unit having a substantially constant effective static deflection for variable loads whereby the frequency of vibration of said unit remains substantially constant for different loads and harmonic action of said unit for all loads supported thereby will remain substantially constant.

CYRUS J. HOLLAND.